United States Patent [19]

Garcia

[11] Patent Number: 5,020,344
[45] Date of Patent: Jun. 4, 1991

[54] AUTOMOBILE ANTI-THEFT DEVICE

[76] Inventor: Gervasio B. Garcia, G.P.O. Box 1201, San Juan, P.R. 00936

[21] Appl. No.: 542,795

[22] Filed: Jun. 25, 1990

Related U.S. Application Data

[63] Continuation of Ser. No. 911,663, Sep. 25, 1986, abandoned, which is a continuation-in-part of Ser. No. 535,822, Sep. 26, 1983, Pat. No. 4,615,355.

[51] Int. Cl.$^5$ .............................................. B60R 25/06
[52] U.S. Cl. ........................................ 70/245; 70/248; 70/255
[58] Field of Search .................. 70/245, 246, 251, 254, 70/255; 137/383

[56] References Cited

U.S. PATENT DOCUMENTS

| | | | |
|---|---|---|---|
| 1,542,137 | 6/1925 | Hoffman | 70/245 |
| 1,859,328 | 5/1932 | Cobb, Sr. | 70/254 |
| 2,020,606 | 11/1935 | Harris | 70/255 |
| 3,610,004 | 10/1971 | Neese | 70/248 |
| 3,718,202 | 2/1973 | Brock | 70/245 |
| 3,910,372 | 10/1975 | Mozzar | 70/255 |

Primary Examiner—A. Michael Chambers
Attorney, Agent, or Firm—Eric P. Schellin

[57] ABSTRACT

An automobile antitheft device having a locking rod that locks the parking lock pawl of an automatic transmission in a position where it engages and locks a parking pawl gear. The locking rod is spring biassed so that it automatically becomes engaged when the automatic transmission is placed into Park. A separate lever is actuated and used to withdraw the locking rod from locking the pawl. The locking rod is provided with a transverse groove to prevent unlocking of the transmission except when the transmission is in Park. The device is also provided with an electric switch and regulator which is operatively coupled to the locking rod as is electrically connected between the fuel injectors and the car's computer.

2 Claims, 4 Drawing Sheets

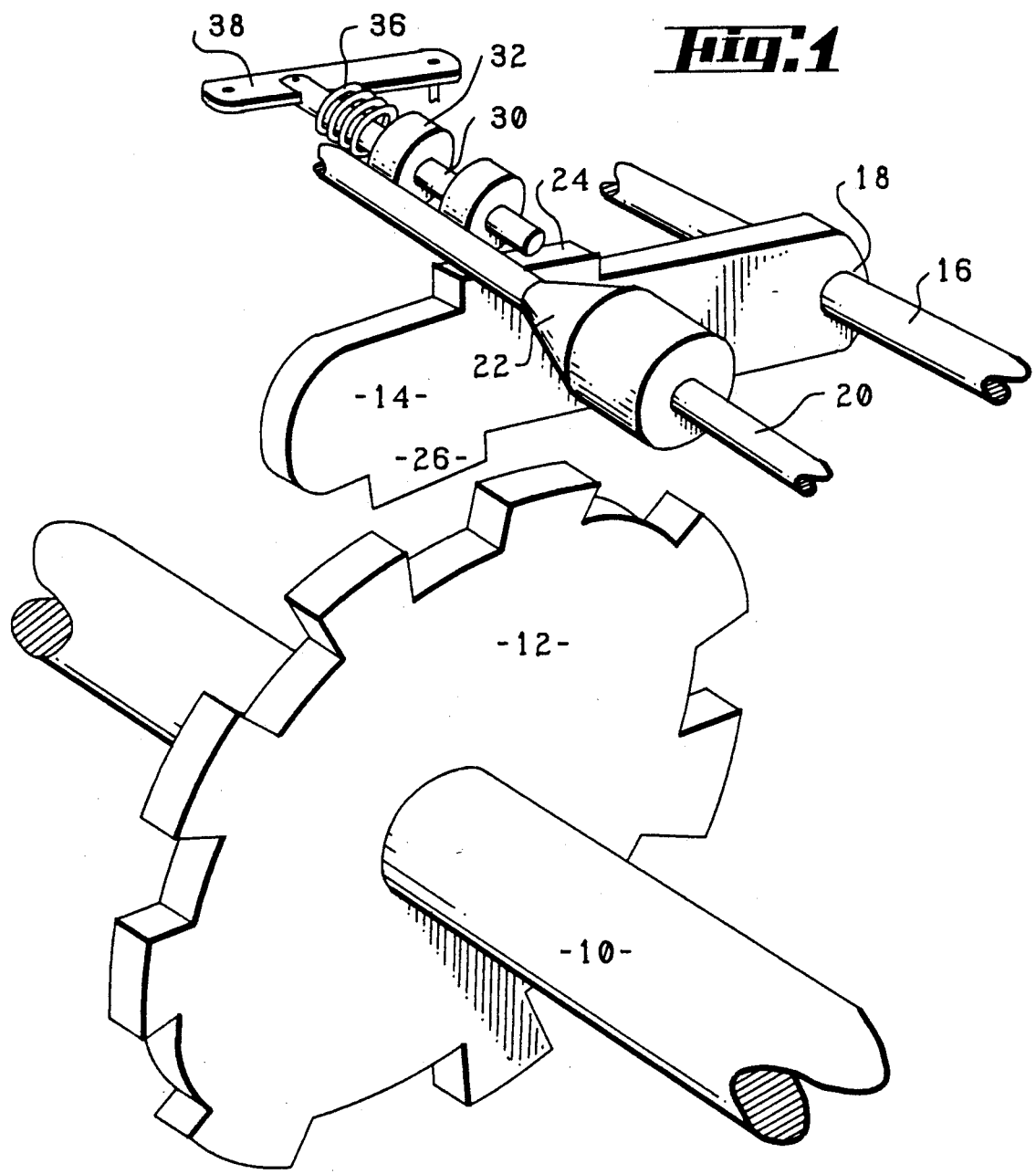

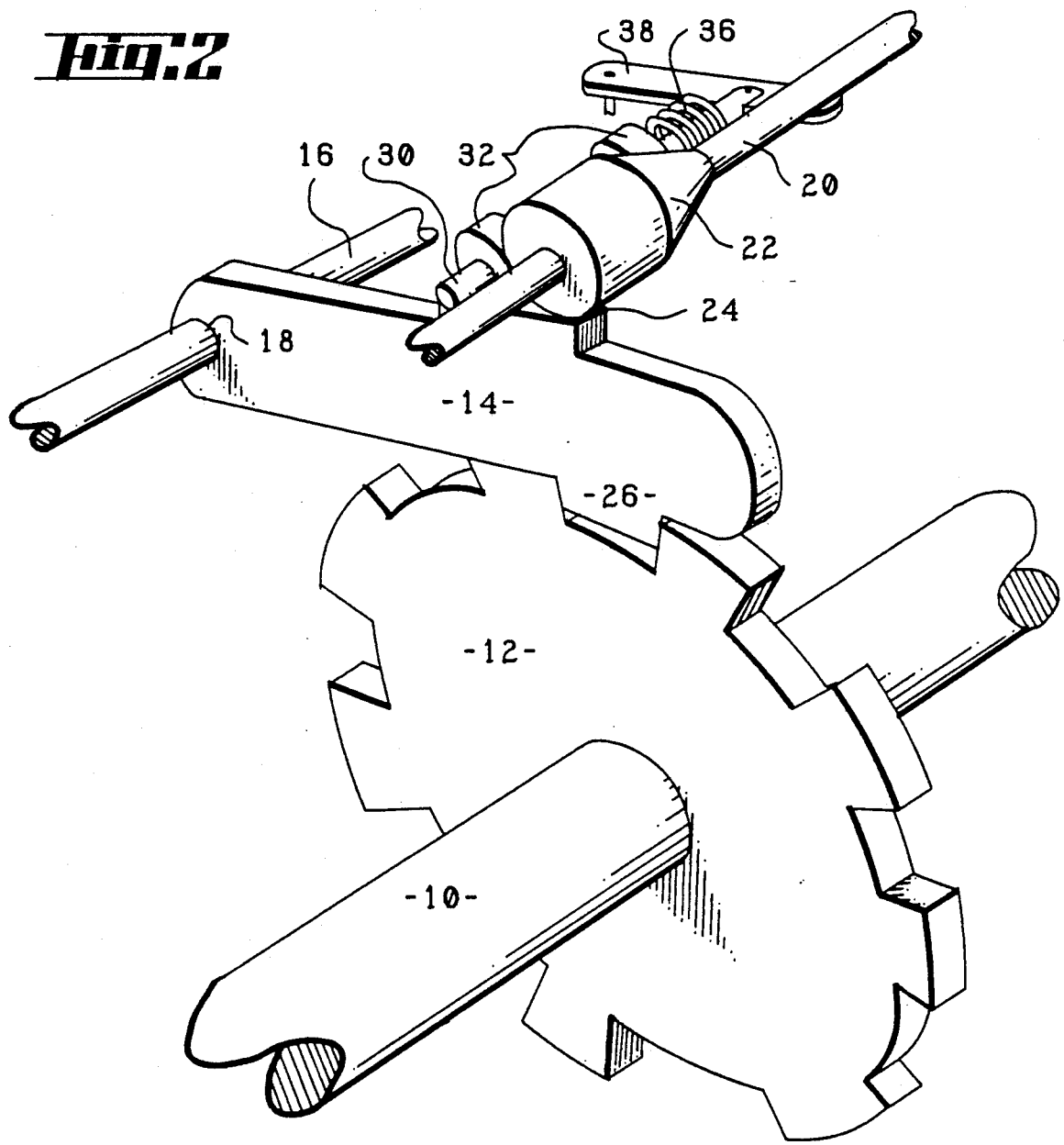

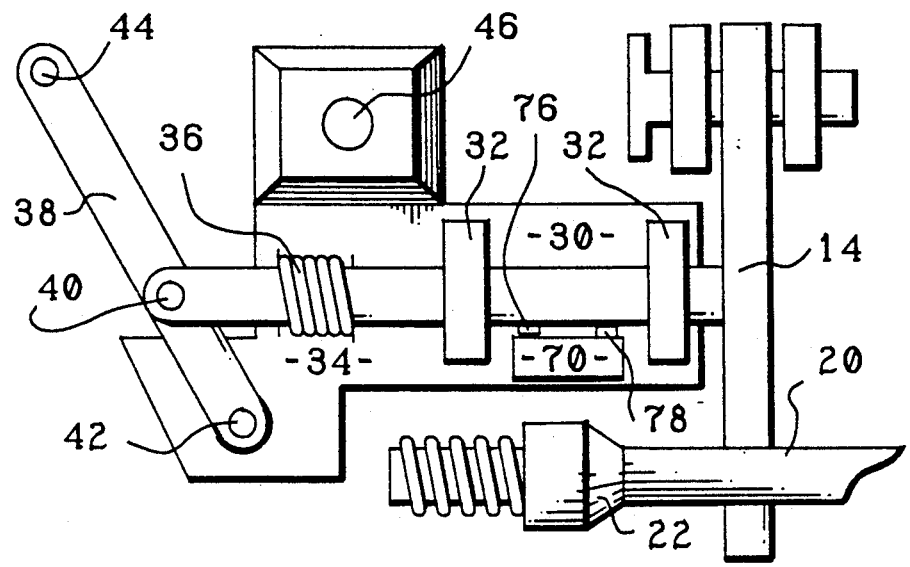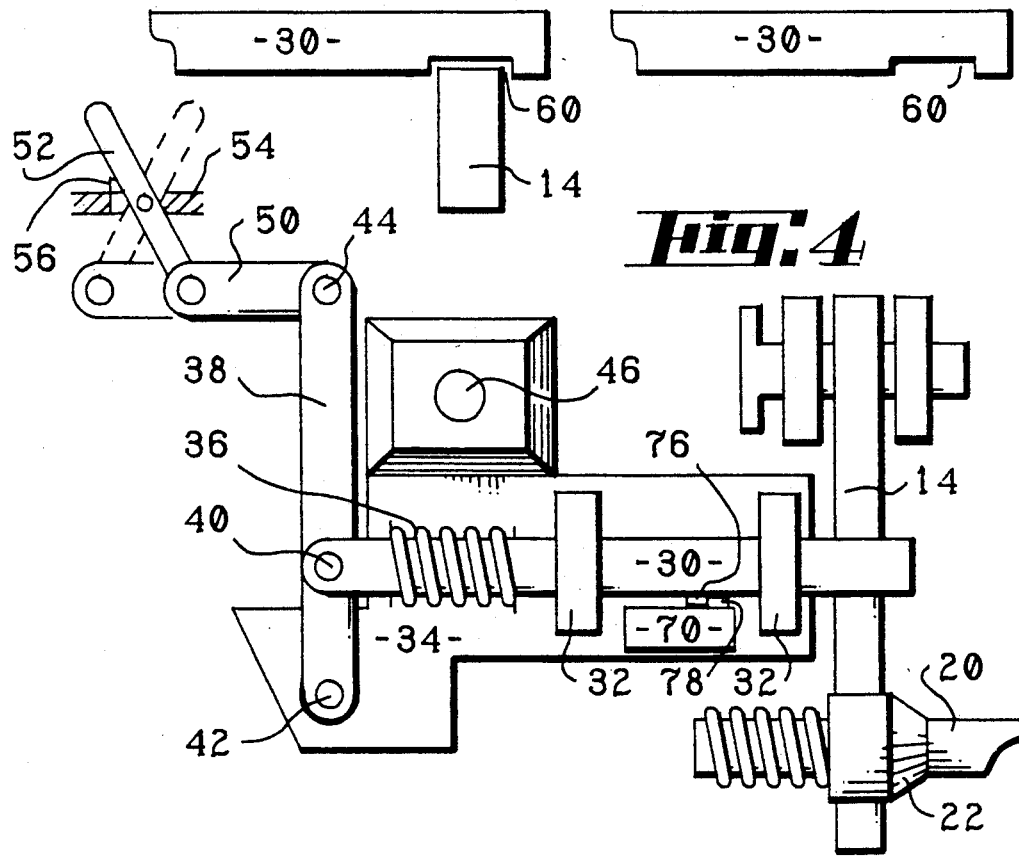

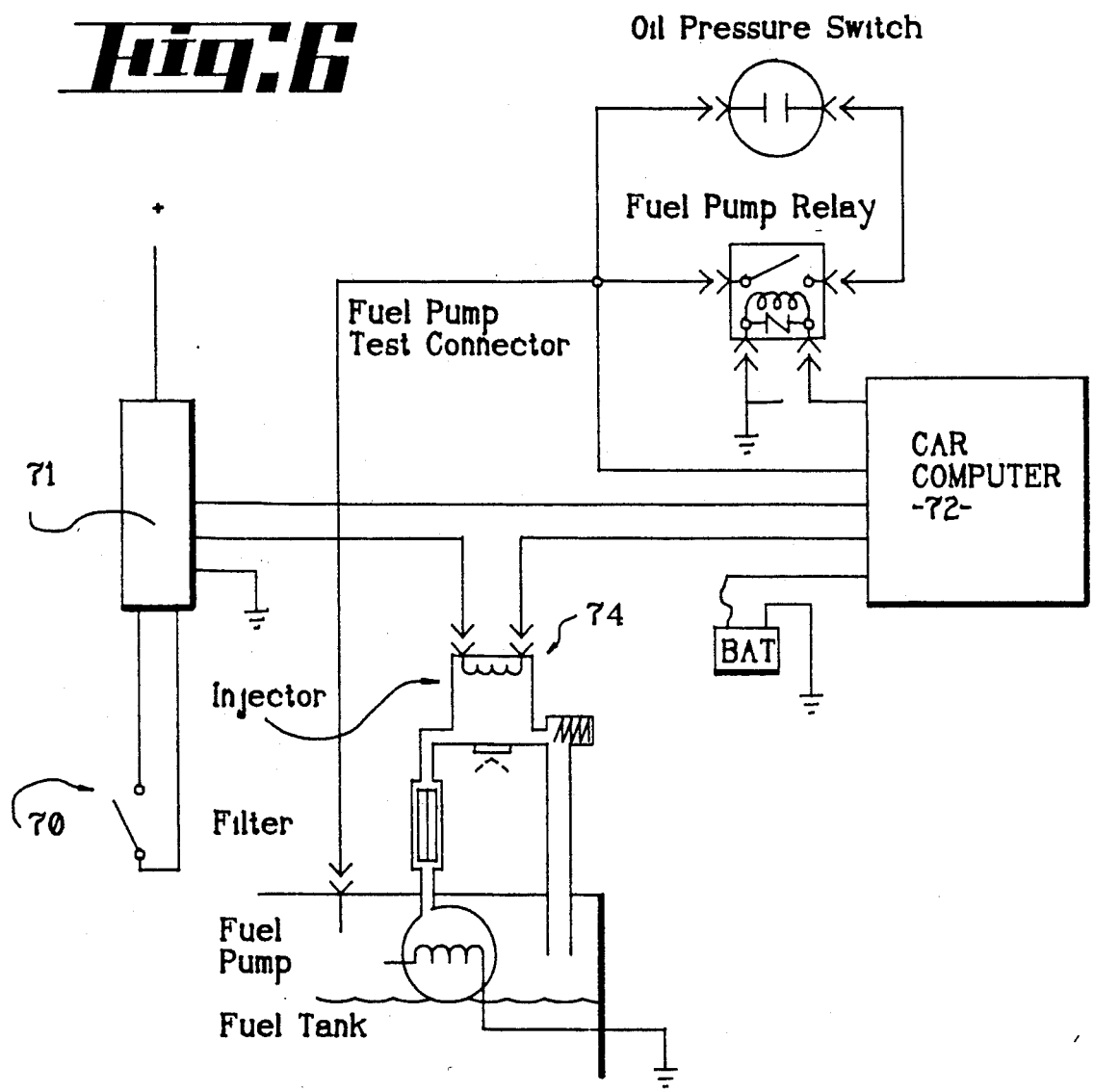

AUTOMOBILE ANTI-THEFT DEVICE

This application is a continuation of application Ser. No. 911,663, filed Sept. 25, 1986, now abandoned, which is a Continuation-In-Part of U.S. patent application Ser. No. 535,822, filed Sept. 26, 1983 now U.S. Pat. No. 4,615,355.

BACKGROUND OF THE INVENTION

1. Field of the Invention

The invention is related to automobile anti-theft devices and particularly to devices for locking an automatic transmission.

2. Description of the Prior Art

In recent years car theft has increased dramatically, resulting in large economic loss. As such cars of the future, not only will be equipped with conventional door locks and ignition locks but will also be provided with other anti-theft locking devices.

Vacuum actuated locking assemblies are disclosed in U.S. Pat. Nos. 3,370,571 and 3,687,215. Transmission locking assemblies are disclosed in U.S. Pat. Nos. 1,692,668, 3,434,315, 3,718,202 and 3,995,462. Of particular interest is U.S. Pat. No. 3,718,202, which discloses an anti-theft system having a locking gear that is positioned to lock gears in a transmission.

SUMMARY

The present invention is directed to an automobile anti-theft device that renders the automatic transmission of an automobile inoperative to a thief. More specifically, a locking rod is slidably mounted to a chassis which is mounted in an automatic transmission. This rod is used to lock the parking locking pawl of the automatic transmission into a locking position with the parking pawl gear. Therefore if the gear shifting means is moved out of park without disengaging the locking rod, the driven shaft is still locked by the parking lock pawl engaging the parking pawl gear. The device is also provided with an electrical switch and regulator which detect the position of the locking rod and are electrically coupled to the fuel injection system to reduce engine output when the locking rod is in the locking position.

It is one of the objects of the present invention to provide an automobile anti-theft device which is low cost and maybe installed within two hours. As such the present locking device is made of small parts that do not make it necessary to modify the transmission in order to install the locking device.

It is another object of the present invention to provide a locking means that is positioned within the transmission so that it may not be easily tampered with, and will be protected from water, dust, rust and other damaging external elements.

It is another object of the present invention to provide a device that is automatically engaged whenever the automatic transmission is placed in Park. In this way the driver does not have to remember to engage the device when leaving the car.

It is another object of the present invention to provide a safety device to prevent the automobile from becoming accidentally disengaged from Park and beginning to unexpectantly move.

It is a further object of the invention, that the device cannot be released unless the automatic transmission is placed into Park. This facilitates security because typically a thief will move the shifting lever to any position but Park in trying to steal a car.

BRIEF DESCRIPTION OF THE DRAWINGS

FIG. 1, is a perspective view of an automatic transmission using the present device, wherein the transmission is not in Park.

FIG. 2, is a perspective view of an automatic transmission using the present device, wherein the transmission is in Park.

FIG. 3, is a top view of the present device in its non-locking position.

FIG. 4, is a top view of the present device in its locking position.

FIGS. 5A and 5B, are side views of the locking rod.

FIG. 6 is an electronic schematic of the fuel injection system.

DETAILED DESCRIPTION

The present invention is adapted to be retrofitted into an automatic transmission, and is particularly adaptable to a Turbo Hydra-matic Transaxle TH-125 and TH-325 General Motors transmissions. As can be seen in FIGS. 1 and 2, the transmission output shaft or driven shaft 10 is rigidly coupled to parking pawl gear 12. Therefore gear 12 must be free to rotate if shaft 10 is to rotate. Gear 12 is locked in position by parking lock pawl 14 that is pivotally coupled to rod 16 a point 18. Typically pawl 14 is biassed away from gear 12 by a spring which is not illustrated.

When a car is put into park, actuator rod 20 is moved towards pawl 14 forcing camming surface 22 into contact with top surface 24 of pawl 14 driving the pawl downward. As the pawl is forced downward, pawl extension 26 engages one of the gear notches of gear 12, locking the gear in place. When an operator shifts the transmission out of Park, actuator rod 20 is moved away from the pawl thereby releasing the pawl so that it is biassed upward and extension 26 no longer engages the gear.

The present invention comprises locking rod 30 which is slidably mounted in bushings 32 that are secured to chassis 34. The locking rod is biassed by spring 36 towards the locking pawl. The locking rod is secured to lever 38 at point 40. The lever is used for withdrawing the locking rod when the transmission is taken out of park. The lever is pivotally coupled to chassis 34 at point 42. The lever is also provided with aperture 44 which may be coupled to any number of suitable remote control assemblies, such as electromagnetic solenoids, vacuum operated systems, tensioned cables, or push pull linkages. Each of these remote control assemblies can be provided with suitable locking means to prevent unauthorized use of the control assemblies.

A simplified linkage system for manipulating lever 38 is illustrated in FIG. 4, comprising link 50 and hand lever 52. The hand lever is pivotally secured to some mounting element 54 and is coupled to link 50 which is used for shifting lever 38. Hand lever 52 is provided with locking means 56 for locking the lever into a locking configuration wherein the locking rod is positioned to lock pawl 14 closed. It should be noted that the locking means does not have to be activated to activate the locking rod and is merely an additional safeguard. In addition, the present invention should not be limited to the illustrated linkage system because lever 38 can be manipulated by any number of remote control assemblies.

The chassis on which the other elements are mounted is secured to the inside of the transmission by screws (not shown) passing through hole 46. In a TH 125 General Motors transmission. the chassis is secured to the screw holding the tube that goes from the centifugal regulator to the transmission body, inside the automatic transmission. In other transmissions the chassis maybe secured to the park brackets using park bracket bolts.

As illustrated in FIGS. 1 and 4, when the transmission is out of Park, locking rod 30 engages the side of pawl 14. The downward extending portion of the pawl does not engage gear 12, therefore driven shaft 10 is free to rotate. However, as illustrated in FIGS. 2 and 5 when the automatic transmission is placed in Park, the pawl is downwardly depressed by camming surface 22. As locking rod 30 is spring biassed towards the pawl, the rod projects over the pawl locking it in place. At this time even if the transmission is shifted out of Park, the locking rod still holds the pawl in a depressed condition thereby preventing rotation of gear 12 and driven shaft 10. Therefore the additional step must be taken of withdrawing the locking rod by movement of lever 38.

As illustrated in FIGS. 5A and 5B, the locking rod is provided with a transverse groove 60 which is adapted and constructed to receive pawl 14. The transverse groove prevents withdrawal of the locking rod except when the shifting means of the car is in Park. As should be appreciated by a person having ordinary skill in the art, camming surface 22 is designed so that it depresses the pawl below the extended position of the locking rod. Therefore, as the camming surface is shifted to change gears, the pawl is forced up slightly becoming nested in Groove 60. As such, locking rod 30 cannot be released until the transmission is again put in Park and the pawl depressed below the groove.

In cars having a computer controlled fuel injection system, switch 70 is mounted on chassis 34 for detecting if locking rod 30 is in its locking or non-locking position. Switch 70 is electrically connected by wires to regulator 71. Regulator 71 is located between car computer 72 and fuel injector 74. The regulator controls the impulses or signals that are sent to fuel injector 74 by computer 72. In this way engine output can be controlled by the regulator by regulating the mount of fuel transmitted to the engine. When locking rod 30 is in its locking position switch 70 is switched opened by projection 76 on locking rod 30 contacting projection 78 on switch 70. The open switch actuates regulator 71 which regulates the output of the fuel injector effectively limiting engine output. When locking rod 30 is returned to its non-locking position switch 70 is closed deactuating the regulator and directly coupling the fuel injectors to the computer so that engine output can be controlled by the computer.

The present invention should not be limited to the above described and illustrated embodiment, but should be limited solely by the claims that follow:

I claim:

1. A security device for an automatic vehicle transmission having a plurality of gears operatively mounted to a chassis consisting of, combination,
    (a) said chassis having means for mounting said device to said automatic transmission,
    (b) bushing means attached to said chasis in which a locking rod is slidably mounted,
    (c) said locking rod attached to an actuator rod and being constructed to engage a locking pawl,
    (d) said locking pawl pivotally attached to the chassis and having a downwardly extending element designed to fit into a groove in a gear of said automatic transmission thereby locking said gear in a non-operative position,
    (e) means for releasing said locking rod and locking pawl consisting of a spring which biases the locking rod into a non locking position thereby releasing the locking pawl from engagement with the gear of the automatic transmission.

2. The device according to claim 1 wherein the locking rod is provided with a transverse groove adapted and constructed to engage the locking pawl.

* * * * *